July 12, 1938.    A. C. FISCHER    2,123,696
INSULATING AND WATERPROOFING MATERIAL
Original Filed May 10, 1922
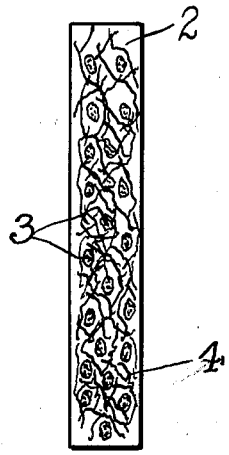
INVENTOR.
Albert C. Fischer.
BY Albert F. Robinson
ATTORNEY.

Patented July 12, 1938

2,123,696

UNITED STATES PATENT OFFICE 2,123,696

INSULATING AND WATERPROOFING MATERIAL

Albert C. Fischer, Chicago, Ill., assignor to The Philip Carey Manufacturing Company, a corporation of Ohio Original application May 10, 1922, Serial No. 559,908. Divided and this application May 14, 1928, Serial No. 277,804

14 Claims. (Cl. 106—31)

This invention relates to a composition material composed of a homogeneous mixture of ingredients compounded and poured in place or preformed into strips, sheets, blocks or the like, and aims to provide a product possessing superior and improved waterproofing and thermal insulating qualities.

The invention consists in the features, combination and arrangement hereinafter described or claimed, for carrying out the above stated objects and such other objects as will hereinafter appear.

This application is a division of application Serial No. 559,908, which was filed May 10, 1922, and matured into Patent No. 1,680,144 August 7, 1928.

Generally described the invention comprises a homogeneous mass of compressible fibrous granules, linear fibers and a waterproofing binder of relatively high melting point for holding the granular material which is distributed throughout and locked within the pockets formed between the linear fibers. This composition is formed by thoroughly mixing the granular material and linear fibrous material with the bituminous binder, said binder having been heated to a plastic condition, after which it is fed into forming devices and made in any desired shape. The ingredients of the composition and method of mixing them produces an article which is thoroughly waterproofed and possessed of a thermal insulating value approximately twice that of ordinary asphalt roofing. The granular material is interspersed through the linear fibrous material and jacketed by the binder, producing an article having sufficient tensile strength.

The drawing is a cross section of a block embodying my invention.

More specifically described the invention is typified by a blown bituminous binder 2 prepared from petroleum asphalt and having incorporated therein a quantity of granules 3 and linear fibers 4, all of which are mixed into a homogeneous mass. Likewise coal tar, pitch, or any other suitable binder which has a considerably high melting point, ranging from 200° to 250°, and which has a high penetration at freezing temperature, preferably about 18° penetration at 40° F., may be employed as the waterproofing means. The compressible fibrous granules are represented by such materials as cork, corn cob pith, mineral wool, etc., and the linear fibers are represented by cotton, cotton seed hulls, rag felt, etc. The latter kind are flexible and readily shape themselves around the granules to lock them in place within the composition.

Strips, blocks or sheets of a composition embodying this invention may be prepared by feeding the mixture under suitable forming devices, for example, pressure rolling elements, or extruding it in a suitable steam-heated extruding machine. Molding or other conventional forming means may likewise be utilized to prepare the plastic material into preformed articles of manufacture.

One method for preparing the composition is typified by heating the bituminous material until it is in a plastic condition, after which the linear fiber and granular material is added thereto, and then all ingredients thoroughly mixed until the composition is in a plastic condition. It is then ready to be fed to a forming device to be made into preformed articles of any desired shape and contour.

While the proportion of the fiber content may be varied, I have found that a composition containing somewhat less than thirty (30) per cent is very satisfactory to obtain a product having the proper waterproofing and insulating quality.

A small quantity of mineral matter may be advantageously added to the composition. If the mineral matter is of an insulating character, such as kieselguhr, magnesia or the like, a larger quantity may be employed without decreasing the ultimate insulating quality of the product.

The novel and improved insulating and waterproofing product secured from this composition is one having a bituminous mass suitably reenforced with linear fiber elements and granules housed within the reenforcing structure, said granules being jacketed by the bituminous material. Such a product is thoroughly waterproof and possesses twice the insulating value of ordinary asphalt roofing, its insulating value being only about fifty (50) per cent below such insulating boards as Celotex, Flaxlinum and the like. However, these insulating boards are not waterproofed and do not have the tensile strength required to adapt them for use as roof coverings, floorings, roofing and the like.

Obviously the invention is not limited to the details described in connection with the embodiment disclosed, or the method of making same, all of which may be variously modified. Moreover it is not indispensable that all features of the invention be used conjointly or that all ingredients of the composition be employed.

I claim:

1. A waterproofing and thermal insulating material comprising a homogeneous mixture of a bituminous substance and a fibrous content distributed therein, said fibrous content comprising a mixture of resilient granular and long interlaced fibrous material.

2. A waterproofing and thermal insulating material comprising a homogeneous mixture containing a preponderant proportion of a bituminous substance and a subordinate proportion of a fibrous content, said fibrous content comprising resilient granular material interspersed within long interlaced fibrous material.

3. A waterproofing and thermal insulating material comprising a homogeneous mixture of a bituminous substance and a fibrous content thoroughly distributed therethrough, said fibrous content being composed of resilient granular material and long interlaced fibers and constituting somewhat less than one third of the mixture.

4. A waterproofing and thermal insulating material comprising a homogeneous mixture of a bituminous binder, long interlaced fibers for reenforcing the binder, and resilient granular material locked within the interstices of the long interlaced fibers and jacketed with the binding material.

5. A waterproofing and thermal insulating material comprising a composition of a bituminous binder, long interlaced fibers thoroughly mixed and incorporated in the binder, and compressible fibrous granular material interspersed among the long interlaced fibers.

6. A waterproofing and thermal insulating material comprising a bituminous binder, long interlaced fibers and a resilient granular vegetable fiber content thoroughly mixed with the binder and having the granules interspersed in the long interlaced fibers, and mineral fibers incorporated with the vegetable fiber content and also distributed through the binder.

7. A waterproofing and thermal insulating material comprising a homogeneous mixture of a bituminous substance, a fibrous content distributed therein, said fibrous content comprising a mixture of resilient granular material and long, interlaced fibrous material and mineral material.

8. A waterproofing and thermal insulating material comprising a homogeneous mixture containing a preponderant proportion of a bituminous substance, a subordinate proportion of a fibrous content, said fibrous content comprising resilient granular material interspersed within long interlaced fibrous material, and mineral material.

9. A waterproofing and thermal insulating material comprising a homogeneous mixture of a waterproofing substance and a fibrous content distributed therein, said fibrous content comprising a mixture of resilient granular material and long interlaced fibrous material.

10. A waterproofing and thermal insulating material comprising a homogeneous mixture of a waterproofing binder, long interlaced fibers for reenforcing the binder, and resilient granular material locked within the interstices of the long interlaced fibers and jacketed with the binding material.

11. A waterproofing and thermal insulating material comprising a homogeneous mixture of a waterproofing substance, a fibrous content distributed therein, said fibrous content comprising a mixture of resilient granular material and long, interlaced, fibrous material and mineral material.

12. A waterproofing and thermal insulating material comprising a homogeneous mixture containing a preponderant proportion of a waterproofing substance, a subordinate proportion of a fibrous content, said fibrous content comprising resilient granular material interspersed within long interlaced fibrous material, and mineral material.

13. A waterproofing and thermal insulating material comprising a homogeneous mixture of a waterproofing substance and a fibrous content distributed therein, said fibrous content comprising a mixture of resilient granular material and feltable vegetable fibers.

14. A waterproofing and thermal insulating material comprising a homogeneous mixture of a waterproofing substance, a fibrous content of resilient granules and feltable fibrous material distributed through the waterproofing substance, and mineral material.

ALBERT C. FISCHER.